A. D. GROVER & E. E. BARBER.
COIN TESTING DEVICE FOR COIN CONTROLLED MACHINES.
APPLICATION FILED OCT. 7, 1912.
1,103,197.
Patented July 14, 1914.
2 SHEETS—SHEET 1.
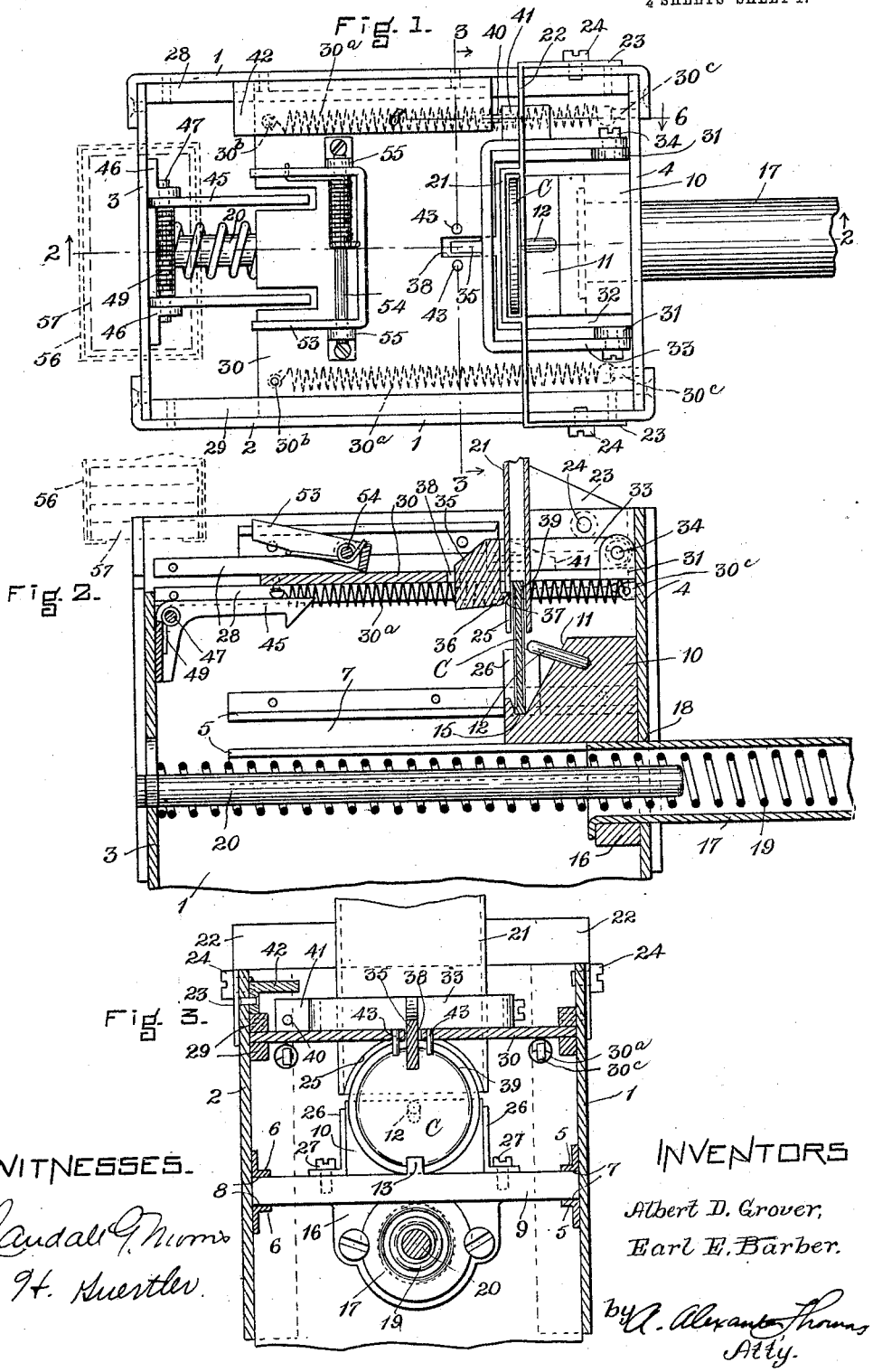
WITNESSES.
Randall G. Norris
H. Kuestler
INVENTORS
Albert D. Grover,
Earl E. Barber.
by A. Alexander Thomas
Atty.

A. D. GROVER & E. E. BARBER.
COIN TESTING DEVICE FOR COIN CONTROLLED MACHINES.
APPLICATION FILED OCT. 7, 1912.
1,103,197.
Patented July 14, 1914.
2 SHEETS—SHEET 2.
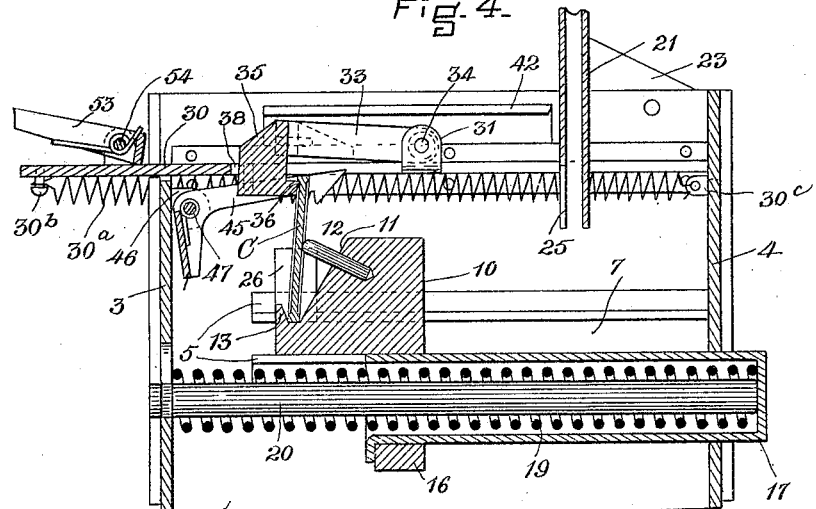
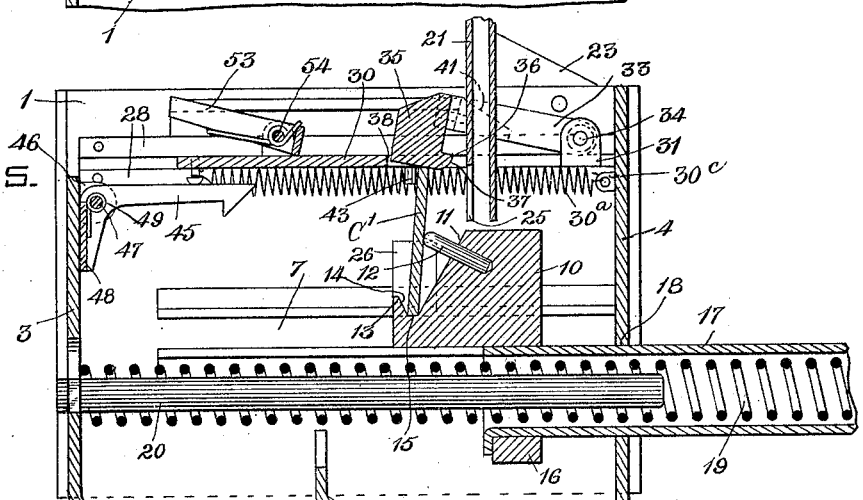
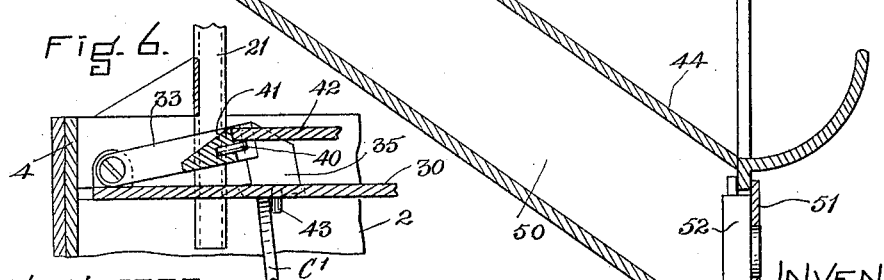
WITNESSES.
INVENTORS.
Albert D. Grover.
Earl E. Barber.

UNITED STATES PATENT OFFICE.

ALBERT D. GROVER, OF MALDEN, AND EARL E. BARBER, OF BOSTON, MASSACHUSETTS, ASSIGNORS TO AUTOSALES GUM & CHOCOLATE COMPANY, OF NEW YORK, N. Y., A CORPORATION OF NEW YORK.

COIN-TESTING DEVICE FOR COIN-CONTROLLED MACHINES.

1,103,197.  Specification of Letters Patent.  Patented July 14, 1914.

Application filed October 7, 1912. Serial No. 724,256.

*To all whom it may concern:*

Be it known that we, ALBERT D. GROVER and EARL E. BARBER, citizens of the United States, and residents, respectively, of Malden, in the county of Middlesex, State of Massachusetts, and Boston, county of Suffolk, State of Massachusetts, have invented certain new and useful Improvements in Coin-Testing Devices for Coin-Controlled Machines, of which the following is a specification.

Our new invention relates to coin-controlled machines generally and has for its object the provision of a coin-testing device for such machines, whereby the machine automatically rejects improper coins.

The characteristic feature of our invention is the testing of the deposited coin as to genuineness by requiring the presence of a well defined raised edge on the coin. Unless the deposited check has such an edge, no operation of the machine takes place. In the preferred form of our invention, our new testing device causes automatic locking of the machine under those conditions. When a proper coin is deposited, the same serves to form a rigid operative connection, through the medium of its raised edge, between a hand-operated member on the outside of the machine and a suitable operating member inside. This operating member may be a goods-ejecting member, or it may serve to control an electric switch or any suitable mechanism.

Our new coin-testing device also serves to test the deposited check as to size. A disk of less than the prescribed diameter will affect the testing device in the same manner as a smooth-edged check of proper size.

In its broad aspect, the coin-testing device of our invention includes a movable testing member adapted to operatively engage the raised edge of the deposited coin which is held in position on a hand-operated coin-carrier. In this way the coin forms a rigid operative connection between the testing member and the coin-carrier. The testing member is connected with a suitable operating mechanism which may be arranged to perform various functions, as above indicated. For the sake of illustrating one particular use of our invention, we have in the drawings shown a goods-ejector connected with the testing member.

In the accompanying drawings, which illustrate a preferred embodiment of our invention, Figure 1, is a plan view of our coin-testing device. Fig. 2, is a longitudinal section on line 2—2 of Fig. 1. Fig. 3, is a transverse section on line 3—3 of Fig. 1. Fig. 4, is a view similar to Fig. 2, but showing the parts in their final or operated position. Fig. 5, is a view similar to Fig. 2, showing how the machine is locked against operation through a deposited slug or other smooth disk; and Fig. 6, is a fragmentary detailed view showing how the testing member of our device locks the machine against operation when a smooth disk is deposited.

The various parts of our coin-testing device are supported in a suitable frame work having sides 1 and 2, a back plate 3 and a front plate 4. To the sides 1 and 2 are secured horizontal angle irons 5 and 6, respectively, to form guide channels 7 and 8 for receiving the base plate 9 of the coin-carrier 10. This coin-carrier is substantially like the one set forth and claimed in our copending application, Serial No. 711,797, filed July 27, 1912, except that for the sake of simplicity we have omitted the weight-testing feature. We do not therefore claim in this application the coin-carrier *per se*. Furthermore, in the broad aspect of our invention, any suitable coin-carrier may be used, provided that it properly supports the deposited coin. The coin-carrier 10 is provided with an inclined surface 11, from which projects rearwardly the pin 12. At its rear end, the coin-carrier has a lug or projection 13 provided with a rearwardly inclined surface 14 which forms with the surface 11, the coin-receiving groove 15.

The base plate 9 of the coin-carrier is provided with a downward extension 16 in which is secured the rear end of the plunger rod or tube 17 in any suitable manner. The plunger rod 17 passes through an opening 18 in the front wall 4 of the supporting frame work, and is adapted to be manipulated from the outside of the machine. Suitable spring means is provided for normally holding the coin-carrier in the position shown in Figs. 1 and 2. In the drawings we have shown an expansion spring 19 bearing at one end against the front of the plunger rod on the inside thereof, and at the other end against the back plate 3 of the frame work. The spring 19 is maintained in proper position by the guide rod 20 which projects forwardly from the back plate 3 and about which the rear portion of the spring 19 is coiled.

When the coin-carrier 10 is in normal or unoperated position, the coin-receiving groove 15 is substantially in alinement with the lower end of the coin-chute 21, which is rigidly supported by any suitable means. In the drawings we have shown the coin-chute 21 carried by a plate 22 having side flanges 23 which engage the side walls 1 and 2 of the frame work. Suitable fastening devices, such as screws 24, pass through the flanges 23 and the sides 1 and 2. The rear wall of the coin-chute 21 is at its lower end cut away to form an arc-shaped opening or recess 25 to allow the coin on the carrier to pass out of the coin-chute. The deposited coin rests at its lower edge in the groove 15, while the pin 12 is adapted to engage the coin substantially at the center, at the initial inward movement of the coin-carrier. As the pin 12 terminates substantially in alinement with the front inner wall of the coin-chute 21, and as the coin-chute is a little wider than the thickness of the coin, the pin 12 does not engage the coin when the carrier is in normal position. The coin is prevented from falling out of its substantially vertical position, because the upper portion of the coin remains in the coin-chute, and the coin-testing member (to be presently referred to) prevents the coin from falling rearwardly. The coin is prevented from rolling sideways off the coin-carrier by means of the retaining strips 26 which are secured to the coin-carrier by screws 27 or otherwise.

To the sides 1 and 2 of the frame work, at a proper distance above the guide strips 5 and 6, are fixed the spaced guide strips 28 and 29 which are provided with grooves or channels for the reception of the slide 30. The latter is at its front end provided with a pair of upstanding ears or lugs 31. Between these ears the slide 30 is cut away to form an opening 32 of such size as to accommodate the coin-chute 21 during the operation of the slide. To the ears 31 is pivoted the coin-testing member 33, which is substantially U-shaped in form. Pins or bolts 34 form the pivotal connection between the ears 31 and the member 33. From the cross-piece of the testing member 33 extends the projection 35 which is at the front provided with the coin-engaging point 36. The under-surface of the projection 35 is rounded or beveled at the point 36 as shown at 37. The projection 35 extends through the slot 38 in the slide 30. Normally the coin-testing member 33 rests by gravity in the position shown in Fig. 2. It will be seen from this figure that when the testing member is in normal position, the engaging point 36 is slightly below the raised edge 39 of the deposited coin C on the coin-carrier 10. With the parts in this position, should the coin-carrier 10 be moved rearwardly by means of the plunger rod 17, the coin C is at once brought into locking engagement with the point 36 on the projection 35 of the coin-testing member 33. The point 36 engages the raised edge 39 of the coin substantially at a point in vertical alinement with the point of engagement of the pin 12. In this way the deposited coin forms a rigid operative connection between the coin-carrier and the testing member 33. Or, more broadly stated, the coin may be said to establish an operative connection between the plunger rod 17 and the slide 30. With a proper coin deposited, the inward movement of the plunger rod 17 is accompanied by a corresponding movement of the slide 30. Any suitable stop means may be arranged for limiting the inward movement of the slide or plunger 17. Contractile springs $30^a$, are at their rear ends secured to pins $30^b$ extending downwardly from the slide 30, and at their front ends to ears or lugs $30^c$, provided on the front wall 4 of the supporting frame work, whereby the slide and the connected parts are automatically returned to normal position when the plunger 17 is released. Fig. 4, shows the parts in their final or operated position. By comparing Figs. 2 and 4 it will be seen that the coin C is slightly tilted forwardly when it forms the connection between the slide 30 and the coin-carrier 10. Also, as the coin engages the testing member 33, it slightly raises the same upwardly as shown in Fig. 4, until the point 36 is firmly hooked into engagement with the raised edge of the coin.

From the above it will be clear that should the deposited check have no well-defined raised edge, the testing member 33 cannot lock itself to the coin by means of the point 36, but the latter will pass out or engagement with the smooth-edged check, as the same is moved rearwardly on the coin-carrier 10. Fig. 5 shows the action of a smooth-edged check on the testing member 33. In this figure, the check is shown at $C^1$. If, in Fig. 2, we imagine the coin to be a smooth-edged check, it will be seen that as the coin-carrier is moved rearwardly and the check is slightly tilted toward the front, the rounded surface 37 of the projection 35 will cause the testing member 33 to ride upwardly over the top of the check, into the position shown in Fig. 5.

In this position of the parts, there is no operative or locking engagement between the coin-testing member 33 and the coin-carrier 10. The member 33 is held in raised or inoperative position by the smooth-edged check C¹. The upward movement of the testing member 33 is limited by the pin 40, extending from the lateral projection 41 of the testing member 33 and adapted to abut against the fixed stop 42, secured to the side 1 of the frame work. When the coin-testing member 33 is in raised position, the lateral projection 41 bears against the stop 42. At the same time the check C¹ bears at its upper edge against the stop pins 43 projecting downwardly from the slide 30 at either side of the slot 38. In this way farther inward movement of the plunger rod 17 is positively prevented. In other words, the machine becomes locked against operation. As soon as the plunger rod 17 is released, the check C¹ is tipped off the coin-carrier and drops into the refunding-chute 44.

Not only does a smooth-edged check of proper diameter lock the machine against operation, as above described, but precisely the same effect is produced by a deposited coin with a raised edge but of less than the prescribed diameter. It will be clear from Fig. 2, that if the raised edge 39 were below the engaging point 36, the coin would ride under the projection 35, in the same manner as described with reference to the smooth-edged check C¹ in Fig. 5.

Our new coin-testing device performs, therefore, the double function of testing the coin as to its genuineness by means of the raised edge thereon, and also, as to its diameter, irrespective of the raised edge. In addition to this, the coin-carrier 10 automatically tests the deposited check as to material and form. For instance, a check of flexible or yieldable material would not withstand the pressure brought to bear upon it by the pin 12 and the testing point 36, but would be bent out of engagement with the projection 35 before the slide 30 was moved to any great extent. The pressure thus exerted upon the coin or check is measured by the resisting force of the springs 19 and 30ᵃ, and may be regulated by varying the resistance of these springs. If the deposited check be of brittle material, such as glass, the strain put upon it will cause it to break. Should the deposited check be a washer, the pin 12 on the coin-carrier will pass through the opening in the washer and cause the latter to fall back on the inclined surface 11 into an inoperative position.

Stop 42 is shown in the form of a rail and performs the additional function of holding the coin-testing member down, after the initial inward movement of the parts, whereby complete operation of the machine is assured—provided of course that a proper coin has been deposited. As clearly seen from Figs. 1 and 3, the lateral projection 41 on the coin-testing member 33 extends under the guide 42 after a slight inward movement of the slide 30. This locks the coin-testing member against accidental upper movement out of engagement with the coin C, thus insuring complete operation of the machine when a good coin is deposited. It should be observed in this connection that when a smooth-edged check is deposited, the guide 42 does not interfere with the raising of the coin-testing member 33 into inoperative position, because the testing of the coin takes place during the initial movement of the coin-carrier and before the lateral projection comes below guide 42.

When the coin-carrier is returned to its normal position under the influence of the spring 19, the coin C is tipped off the coin-carrier by the latch arms 45, as will be clearly understood from Fig. 4. These arms are pivoted to a pair of ears 46 by means of the pin 47. The ears 46 are secured to the rear wall 3 of the supporting frame work. A cross-piece 48 connects the latch arms together at the rear, so that they move as one member. A spring 49, coiled about the rod 47, normally holds the arms in a substantially horizontal position, as shown in Figs. 2 and 5. The outer ends of the latch arms 45 are beveled, so that the coin C will ride under them, as the parts move into final position. Upon return of the coin-carrier, the hooked ends of the latch arms 45 will engage the coin and cause it to fall off the coin-carrier into a coin-receptacle 50 below. Access to this receptacle is had through a door 51 which is locked by any suitable lock 52.

The slide 30 may have connected therewith any suitable device for performing any desired function upon complete operation of the slide. For the sake of illustration, we have shown a suitable form of goods-ejector 53 pivoted on top of the slide 30 by means of the rod 54 which is supported in ears or lugs 55 projecting upwardly from the slide. In Figs. 1 and 2 we have indicated in dotted lines at 56, a magazine containing a vertical stack of packages 57. When the slide 30 is moved rearwardly to its full extent, the ejector 30 pushes the lowermost package 57 out of the magazine into a suitably arranged delivery-chute, for removal by the purchaser. It will be obvious that the goods-ejector 53 may be replaced by a device adapted to operate an electric switch, or to set into operation some automatic machine, or perform various other functions.

It should be observed that while the good coins with which the machine has been operated, are discharged into a money receptacle 50, all smooth-edged checks are returned to the operator through the refunding chute 44. The reason for this return of improper checks is that good-coins in which the edge has been greatly worn down will not operate the machine, and it is proper that such coins should be returned to the intended purchaser.

While we have herein shown and described a specific construction embodying our invention, we would have it understood that the basic principle of our invention may be mechanically carried out in various ways.

Having thus described our invention, what we claim as new and desire to secure by Letters Patent of the United States is:

1. In a coin-testing device, the combination with a movable coin-carrier adapted to hold the deposited coin in rigid operative position, manually operable means for actuating said coin-carrier of a movable testing member normally disconnected from said coin-carrier and adapted to operatively engage the raised edge of the deposited coin, whereby said coin-carrier and said testing member become rigidly locked together for simultaneous movement, and operating mechanism connected with said testing member.

2. In a coin-testing device, the combination with a movable coin-supporting member, manually operable means for actuating said member of a movable coin-testing member normally disconnected therefrom and adapted to operatively engage the raised edge of the supported coin, whereby said members become rigidly locked together for simultaneous movement.

3. In a coin-testing device, a movable support, a coin-testing member pivoted thereto, hand-operated mechanism for carrying the deposited coin into engagement with said member, and means provided on said member for operatively engaging the raised edge of the coin to lock said support and said mechanism rigidly together for simultaneous operation, said coin-testing member being automatically rocked into inoperative position by a substantially smooth-edged check.

4. In a coin-testing device, the combination of a movable support, a coin-testing member pivotally mounted thereon and adapted to operatively engage the raised edge of the deposited coin, said member being automatically rocked and held in a locking position by a substantially smooth-edged check, hand-operated mechanism for carrying the deposited coin into engagement with said coin-testing member to cause simultaneous operation of said support with said mechanism, a fixed stop arranged in the travel path of said member when in locking position, and stop means on said support for engaging the smooth-edged check after said member has been rocked thereby into locking position, whereby said smooth edged check locks said mechanism and said support against operation.

5. In a coin-testing device, the combination with a coin-carrier adapted to support a coin in rigid and substantially upright position, manually operable means for actuating said coin-carrier of a movable coin-testing member adapted to engage the raised edge of the coin on the carrier and thereby become operatively connected with said carrier, said member being automatically moved into inoperative position by a smooth-edged check.

6. In a coin-testing device, a slidable coin-carrier adapted to support a coin in rigid and substantially upright position, a slidable support normally disconnected from said coin-carrier, and a coin-testing member pivotally mounted on said support and adapted to engage the raised edge of the coin on the carrier, whereby said support and said carrier are connected together for simultaneous operation, said testing member being automatically moved into inoperative position by a smooth-edged check.

7. In a coin-testing device, a slidable coin-carrier adapted to support a coin in rigid and substantially upright position, a slidable support normally disconected from said coin-carrier, a coin-testing member pivotally mounted on said support and adapted to engage the raised edge of the coin on the carrier, whereby said support and said carrier are connected together for simultaneous operation, said testing member being automatically moved into inoperative position by a smooth-edged check, a fixed stop, a projection on said testing member arranged to abut against said stop when said member is in said inoperative position, and stop means on said support to engage the coin or check when said support is locked against movement by said testing member, whereby said coin-carrier is locked against operation.

8. In a coin-testing device, a hand-operated slidable coin-carrier, a slidable member normally disconnected from said coin-carrier, and means on said member for engaging the raised edge of a coin on said carrier to lock said carrier and said member together for simultaneous operation.

9. In a coin-testing device, a combination with a slidable coin-carrier, of a slidably and pivotally supported testing member normally disconnected from said coin-carrier and adapted to engage the raised edge of a coin on said carrier, whereby said testing member becomes operatively connected with said coin-carrier.

10. In a coin-testing device, the combination with a freely slidable coin-carrier, of mechanism for automatically locking said carrier against operation through the medium of substantially smooth-edged check or coin of less than proper diameter.

11. In a coin-testing device, a slidable supporting member, means on said member for operatively engaging the raised edge of a coin, hand-operated mechanism for carrying the coin into engagement with said means to cause operation of said member simultaneously with said mechanism which is normally disconnected from said member, and means for automatically locking said member and said mechanism against operation through the medium of a smooth-edged check.

12. In a coin-testing device, a substantially U-shaped testing member provided with a tip for engaging the raised edge of a coin, a slidable support on which said member is pivotally mounted, said member having a beveled under-surface at the tip to cause a smooth-edged check or a coin of less than the proper diameter to ride under said member, and hand-operated means for carrying the deposited coin into engagement with said member to operate said support.

13. In a coin-testing device, a substantially U-shaped member provided with a tip for engaging the raised edge of a coin, a slidable support on which said member is pivotally mounted, said member having a beveled under-surface at the tip to cause a smooth-edged check or a coin of less than proper diameter to raise said member and ride under the same, means whereby said member when raised automatically lock said support against movement, and stop means on said support to engage the check or coin on said hand-operated means when the support is locked by said member, whereby said hand-operated means becomes locked against movement.

14. In a coin-testing device, a freely slidable member, a hand-operated member normally disconnected from said first member and normally free to be operated, and means whereby said members become connected together for simultaneous operation only through the medium of a proper coin with a well defined edge, said means automatically causing said members to become locked against operation through the medium of a smooth-edged check or a coin of less than the proper diameter.

15. In a coin-testing device, movable mechanism for holding a coin in rigid and substantially upright position, and independent mechanism adapted to engage only the raised edge of said coin, whereby said mechanisms become operatively connected together for simultaneous movement, and actuating means connected with one of said mechanisms.

16. In a coin-testing device, the combination with a movable coin-supporting member, of a movable coin-testing member normally disconnected therefrom and adapted to operatively engage the raised edge of the supported coin, whereby said members become locked together for simultaneous operation, actuating means connected with one of said members, and an independent device for discharging the coin from said coin-supporting member.

17. In a coin-testing device, the combination of a pair of independent and normally disconnected members mounted to move in substantially parallel paths, coöperating means on said members whereby only a proper coin with a raised edge is rigidly held between said members and operatively connects the same for simultaneous movement, and actuating means connected with one of said members.

18. In a coin-testing device, the combination of a pair of independent and normally disconnected members mounted to move in substantially parallel paths, coöperating means on said members whereby only a proper coin with a raised edge is rigidly held between said members and operatively connects the same for simultaneous movement, actuating means connected with one of said members, and an independent device for positively ejecting the coin from between said members.

19. In a coin-testing device, the combination with a slidable coin-carrier, of a slidably and pivotally supported testing member normally disconnected from said coin-carrier and adapted to engage the raised edge of a coin on said carrier, whereby said testing member becomes operatively connected with said coin-carrier, and independent means for ejecting the coin from said coin-carrier.

In witness whereof, we hereunto subscribe our names this 25th day of September, 1912.

ALBERT D. GROVER.
EARL E. BARBER.

Witnesses:
JOSEPH KATZ,
WILLIAM C. DIXON.